United States Patent
Patrick et al.

(10) Patent No.: US 11,000,125 B2
(45) Date of Patent: May 11, 2021

(54) CONFIGURABLE COMPUTER WORKSTATION

(71) Applicant: RedRick Technologies Inc., Mount Brydges (CA)

(72) Inventors: Gregory David Patrick, Mount Brydges (CA); Maurice Franciscus Zwinkels, Mount Brydges (CA); Vivian Francesca Dall'Armi, London (CA)

(*) Notice: Subject to any disclaimer, the term of this patent is extended or adjusted under 35 U.S.C. 154(b) by 283 days.

(21) Appl. No.: 16/034,375

(22) Filed: Jul. 13, 2018

(65) Prior Publication Data

US 2020/0015588 A1  Jan. 16, 2020

(51) Int. Cl.
| | | |
|---|---|---|
| *A47B 81/06* | (2006.01) | |
| *A47B 81/00* | (2006.01) | |
| *A47B 45/00* | (2006.01) | |
| *A47B 96/14* | (2006.01) | |
| *A47B 43/00* | (2006.01) | |

(52) U.S. Cl.
CPC .............. *A47B 81/00* (2013.01); *A47B 43/00* (2013.01); *A47B 45/00* (2013.01); *A47B 81/06* (2013.01); *A47B 96/14* (2013.01); *A47B 96/1441* (2013.01)

(58) Field of Classification Search
CPC ..... A47B 81/061; A47B 81/062; A47B 81/00; A47B 81/10; A47B 81/108; A47B 5/00; A47B 5/02; A47B 5/06; A47B 9/00; A47B 9/10; A47B 9/12; A47B 39/02; A47B 13/00; A47B 17/033; A47B 21/00; A47B 2021/0321; A47B 2021/0364; A47B 83/001; A47B 2097/005; A47B 2097/006; A47B 2200/091; A47B 2230/16; A47B 43/00; A47B 45/00; A47B 96/14; A47B 96/1441; A47B 41/02
USPC .... 248/188.1, 346.01, 346.03, 917–921, 924
See application file for complete search history.

(56) References Cited

U.S. PATENT DOCUMENTS

| | | | | |
|---|---|---|---|---|
| 6,751,914 | B2 * | 6/2004 | Zeh ...................... | A47B 83/001 108/60 |
| 8,276,523 | B2 * | 10/2012 | Miller .................... | A47B 21/00 108/50.02 |
| 8,292,250 | B2 * | 10/2012 | Jines ..................... | A47B 19/002 108/176 |
| 8,573,554 | B2 * | 11/2013 | Jines .................... | A47B 19/002 108/176 |

(Continued)

*Primary Examiner* — Nkeisha Smith
(74) *Attorney, Agent, or Firm* — Brunet & Co. Ltd.; Robert Brunet; Hans Koenig

(57) ABSTRACT

A configurable computer workstation has a base unit and at least one expansion unit, the units having height-adjustable legs and horizontal beams. A connecting structure hingedly and removably connects the expansion unit to the base unit to permit repositioning of the third height-adjustable leg spatially in a horizontal plane relative to the first and second height-adjustable legs. A clampable monitor mount is clampable on one of the beams and is infinitely adjustable along a length of the beam. Motorized height adjustment structures on the units are synchronized for adjusting height of the beams by the same amount in the same direction upon operation of a common control. The workstation is thereby modular, expandable and reconfigurable to permit configuring the workstation to accommodate physical space, ergonomics and the tasks to be performed at the workstation.

17 Claims, 15 Drawing Sheets

(56) References Cited

U.S. PATENT DOCUMENTS

| | | | | |
|---|---|---|---|---|
| 8,967,054 | B2* | 3/2015 | Henriott | A47B 13/06 |
| | | | | 108/50.02 |
| 9,179,768 | B2* | 11/2015 | Stubbs | A47B 9/00 |
| 9,232,855 | B2* | 1/2016 | Ergun | A47B 9/02 |
| 9,271,567 | B2* | 3/2016 | Wu | A47B 3/002 |
| 9,516,945 | B2* | 12/2016 | Johnson | A47B 83/001 |
| 9,538,843 | B2* | 1/2017 | Stubbs | A47B 9/00 |
| 9,560,913 | B2* | 2/2017 | Scharing | F21V 21/22 |
| 9,884,321 | B2* | 2/2018 | Huester | A47B 83/001 |
| 9,999,295 | B1* | 6/2018 | Game | F16M 11/28 |
| 10,045,611 | B1* | 8/2018 | Siebert | A47B 21/03 |
| 10,114,352 | B2* | 10/2018 | Matlin | A47B 9/02 |
| 10,433,638 | B2* | 10/2019 | Swartz | F16M 11/42 |
| 10,568,418 | B2* | 2/2020 | Applegate | A47B 9/00 |
| 2004/0082334 | A1* | 4/2004 | Petrick | H02G 3/0493 |
| | | | | 455/450 |
| 2006/0016372 | A1* | 1/2006 | Younse | A47B 21/0314 |
| | | | | 108/44 |
| 2008/0035031 | A1* | 2/2008 | Yamanishi | A47B 87/002 |
| | | | | 108/50.02 |
| 2013/0001177 | A1* | 1/2013 | Jines | A47B 19/002 |
| | | | | 211/26 |
| 2014/0360413 | A1* | 12/2014 | Schenk | A47B 21/02 |
| | | | | 108/50.11 |
| 2015/0083870 | A1* | 3/2015 | Steelman | F16B 12/44 |
| | | | | 248/121 |
| 2019/0350358 | A1* | 11/2019 | Knapp | A47B 21/03 |
| 2019/0357676 | A1* | 11/2019 | Matthai | A47B 97/00 |
| 2019/0374025 | A1* | 12/2019 | Bowman | F16M 13/022 |
| 2020/0154881 | A1* | 5/2020 | Applegate | A47B 13/02 |

* cited by examiner

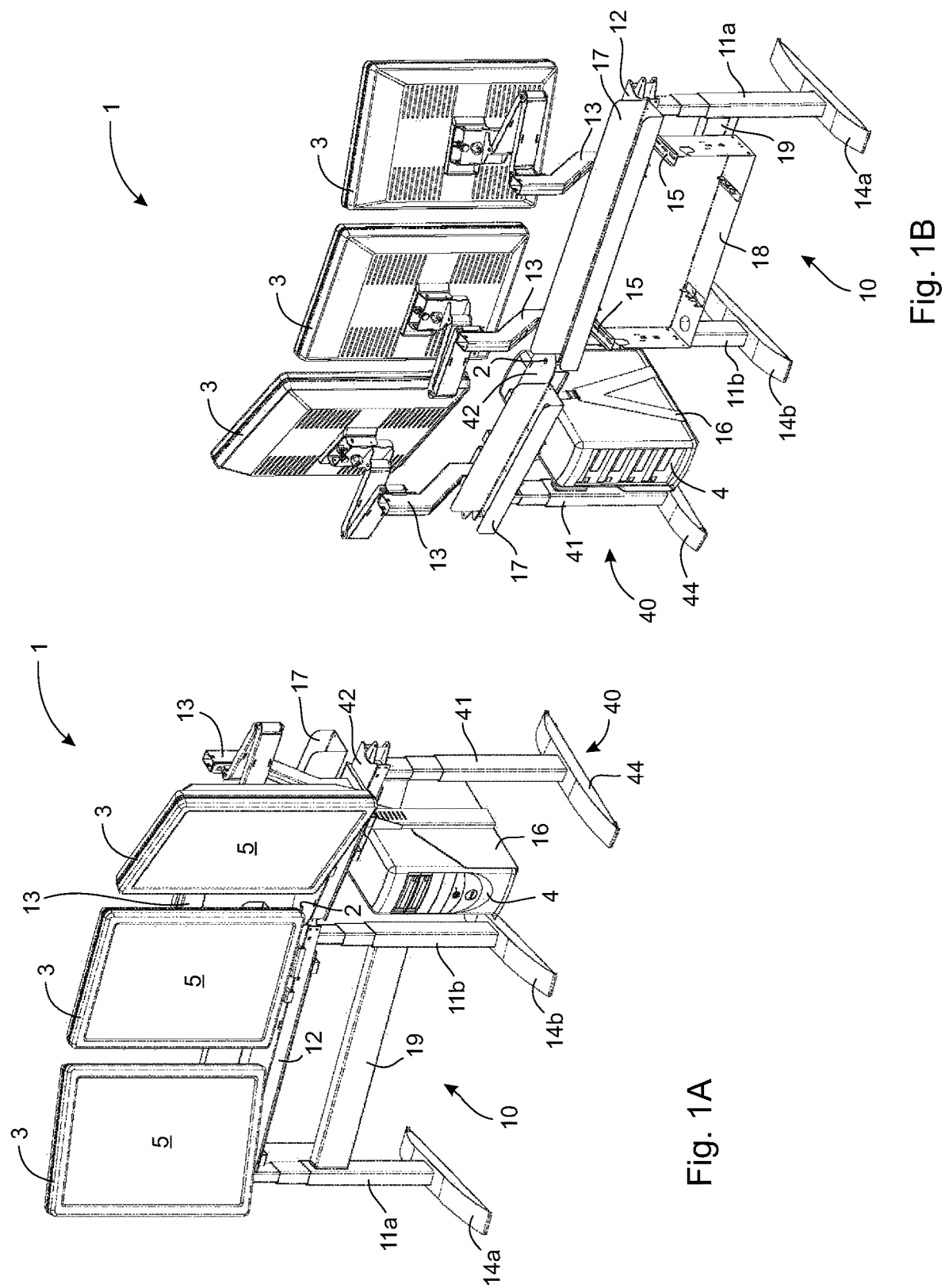

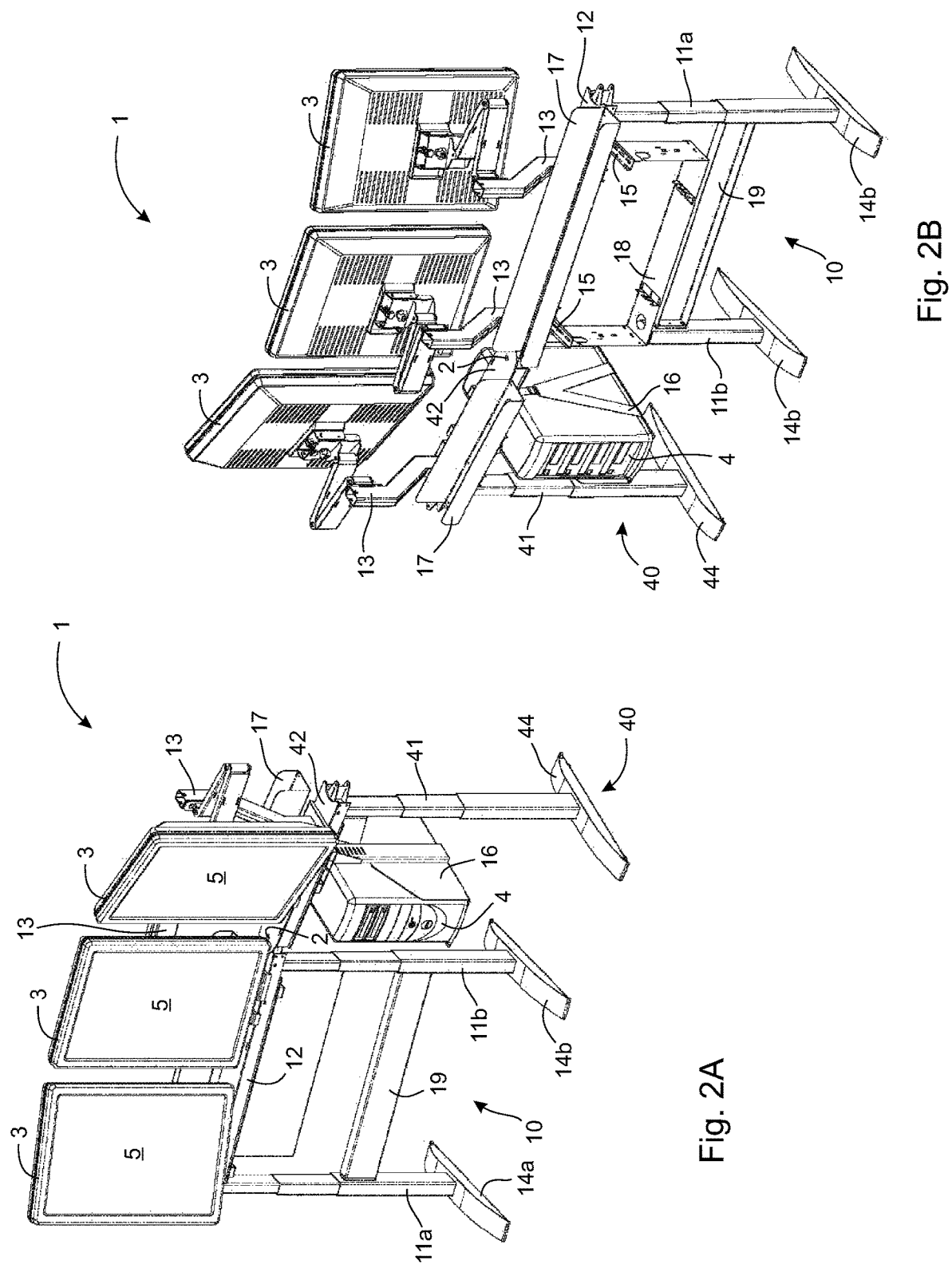

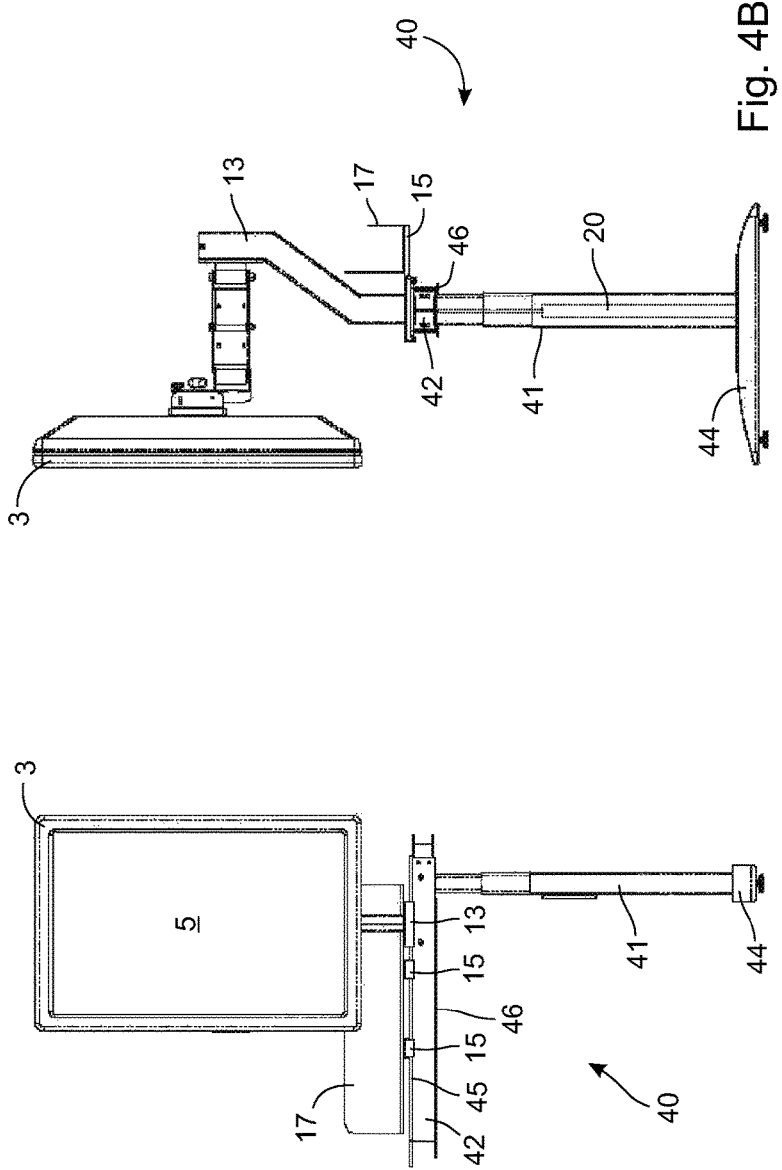
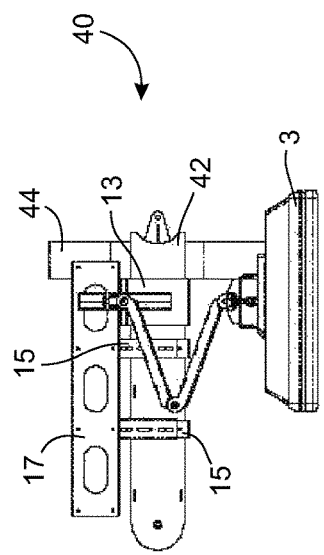
Fig. 4B
Fig. 4C
Fig. 4A

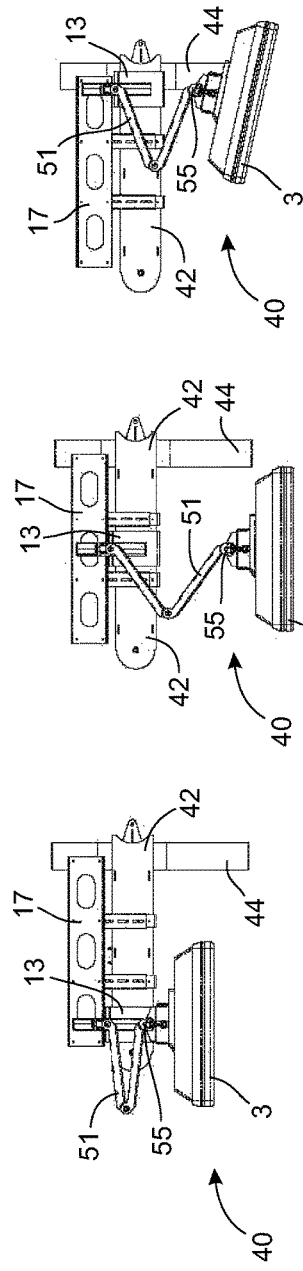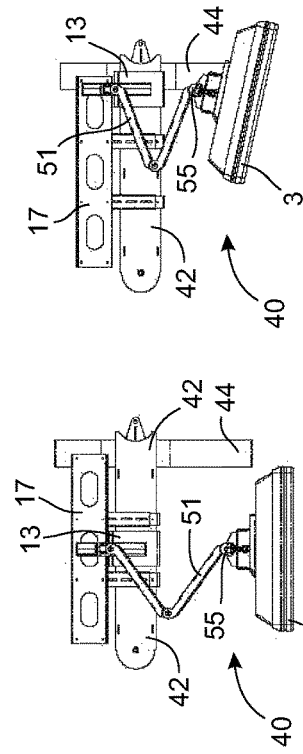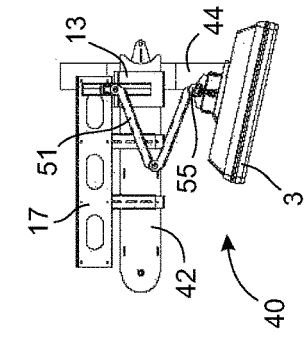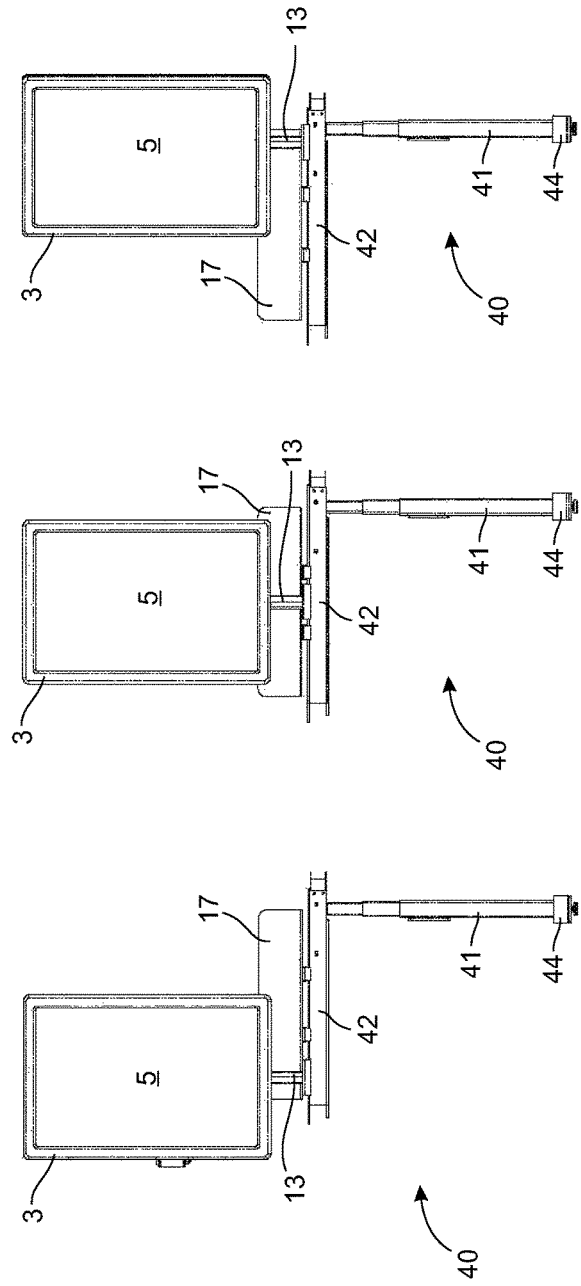

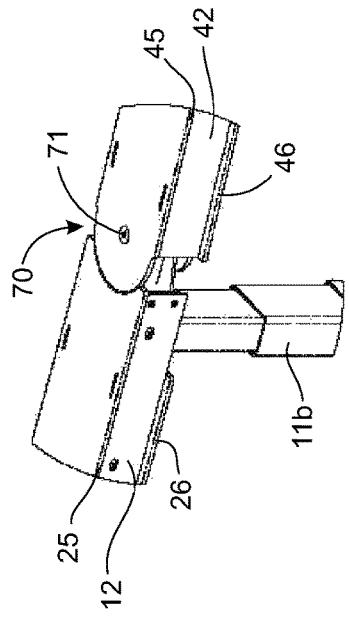
Fig. 7B
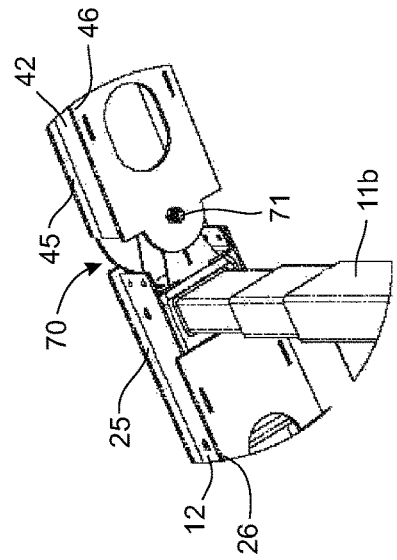
Fig. 7D
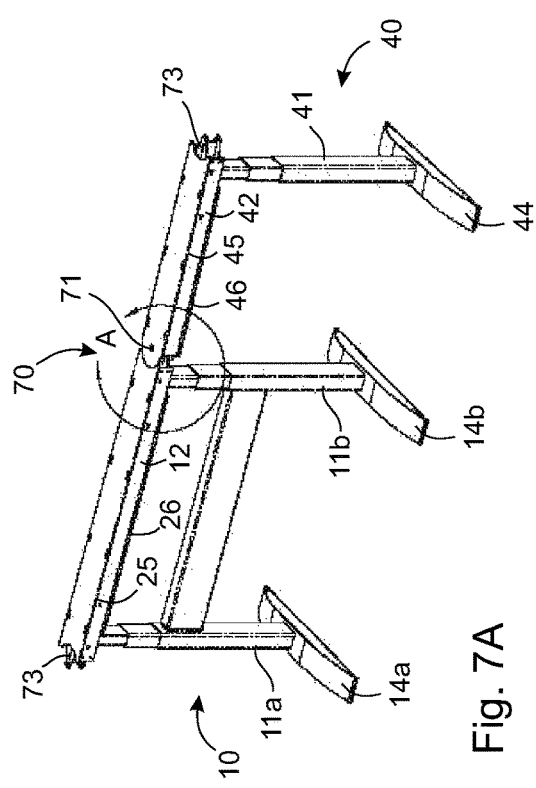
Fig. 7A
Fig. 7C

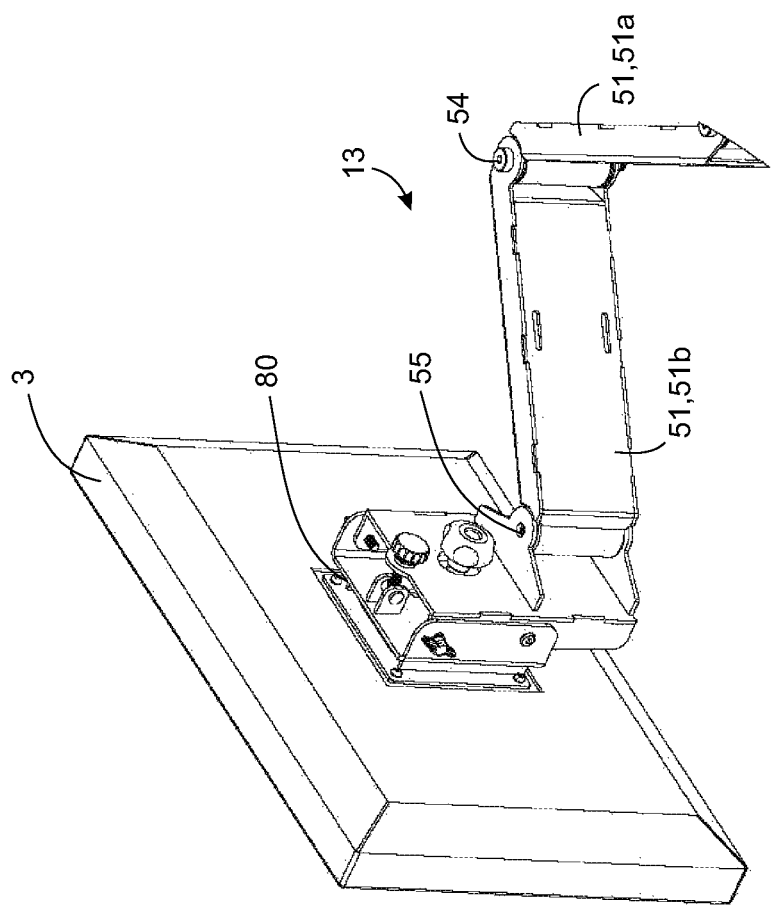
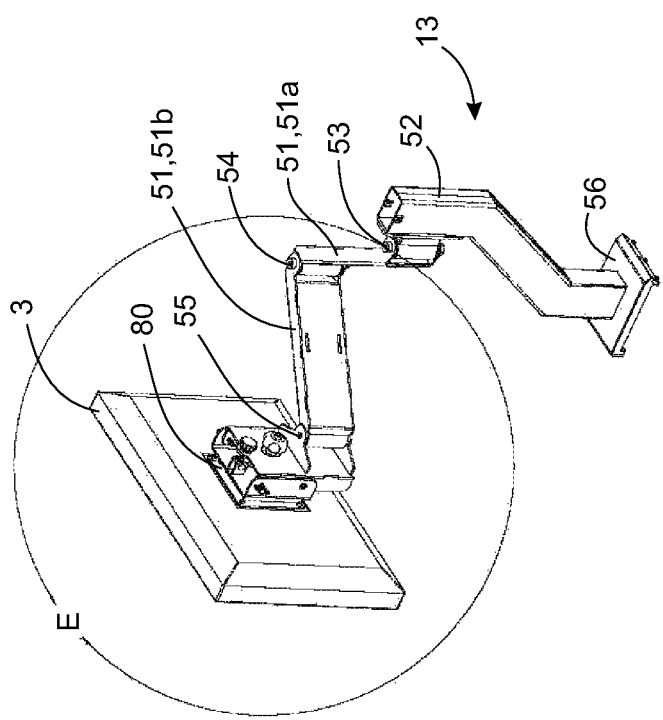
Fig. 8B
Fig. 8A

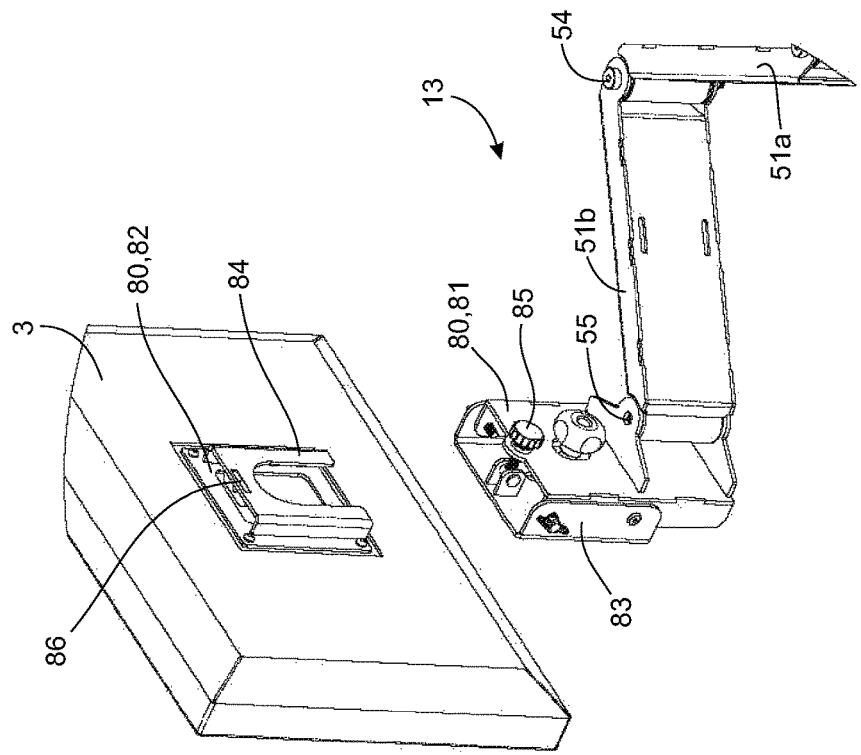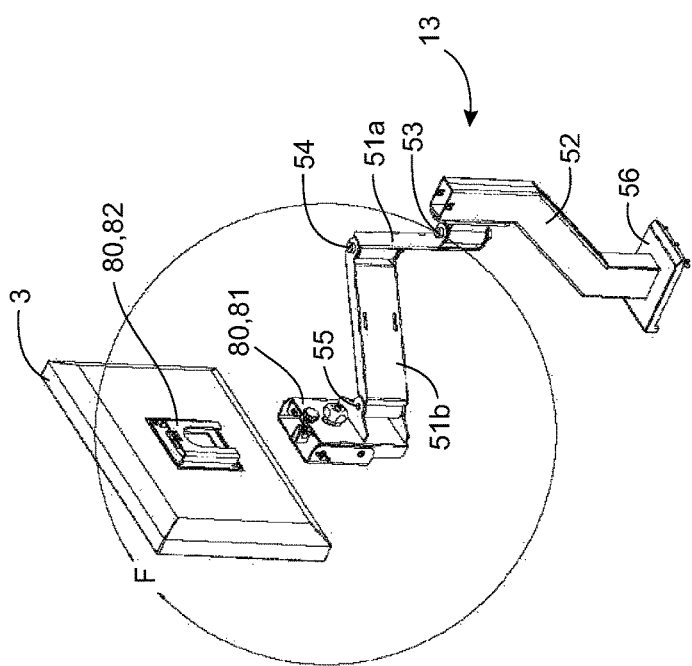
Fig. 8D
Fig. 8C

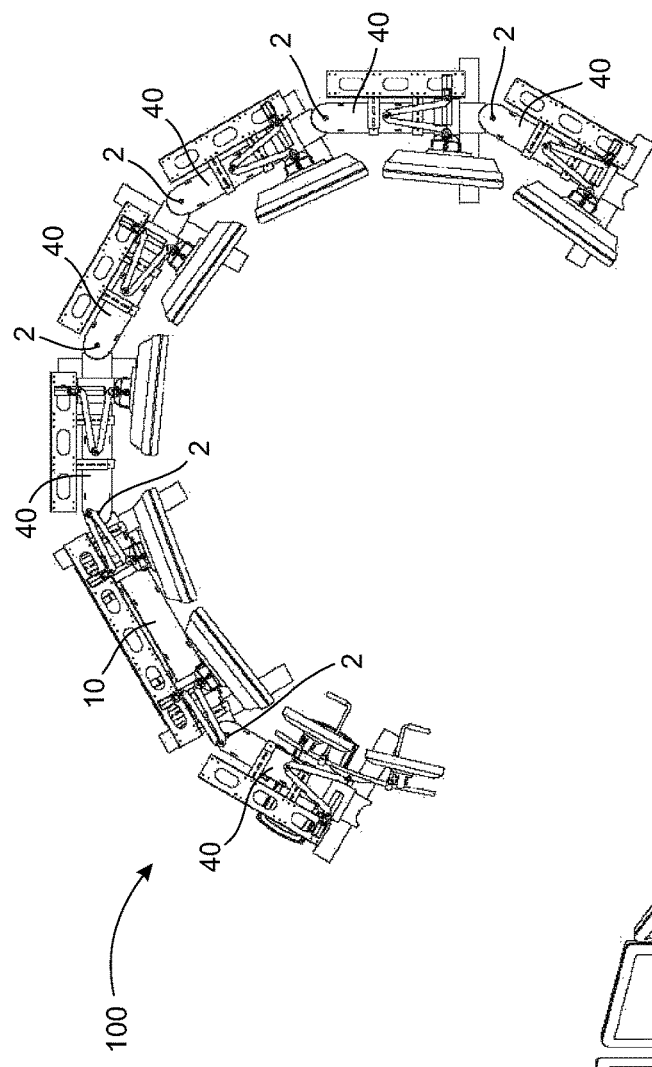
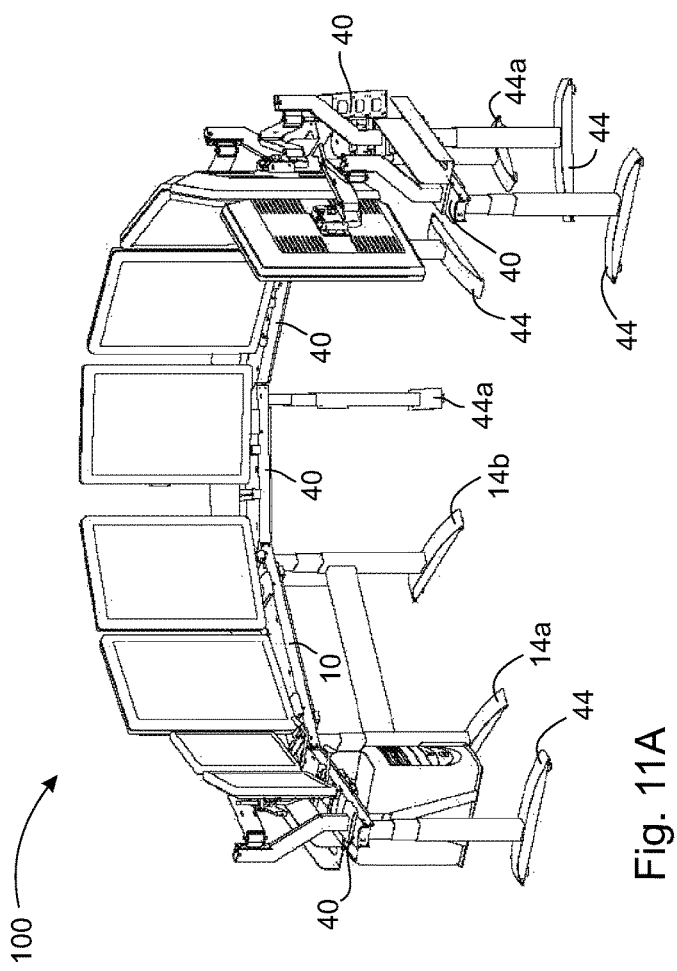
Fig. 11B
Fig. 11A

CONFIGURABLE COMPUTER WORKSTATION

FIELD

This application relates to workstations, particularly to computer workstations.

BACKGROUND

Computer workstations generally comprise furniture (e.g. a desk or table) on which computer equipment including a central processing unit, a video monitor, a keyboard, a computer mouse, an external disk drive, and the like, as well as paperwork and other ancillary equipment and items are arranged. More recently, computer workstations have been developed that employ multiple output devices (e.g. video monitors) linked to a single central processing unit (CPU) controlled by a user from a common input device (e.g. keyboard and/or mouse). Such workstations are useful for tasks that require the user to observe data displayed on multiple output devices and provide data input separately to the data files or computer programs that are serving each of the output devices.

Current workstation furniture is generally inadequate for providing a configuration of the furniture that can accommodate multiple output devices such as video monitors while being both ergonomically sound for any particular user and modular to permit expansion and reconfiguration of the workstation to accommodate physical space and ergonomics. There remains a need for such a computer workstation.

SUMMARY

In one aspect, there is provided a configurable computer workstation comprising: a base unit comprising first and second height-adjustable legs and a first horizontal beam, the first and second height-adjustable legs rigidly connected by the first horizontal beam; at least one expansion unit comprising a third height-adjustable leg and a second horizontal beam, the third height-adjustable leg rigidly connected to the second horizontal beam proximate an end of the second horizontal beam; a connecting structure for hingedly and removably connecting the expansion unit to the base unit to permit repositioning of the third height-adjustable leg spatially in a horizontal plane relative to the first and second height-adjustable legs; a clampable monitor mount clampable on one of the beams, the clampable monitor mount infinitely adjustable along a length of the one beam; and, a first motorized height adjustment structure on the base unit for adjusting height of the first horizontal beam, a second motorized height adjustment structure on the expansion unit for adjusting height of the second horizontal beam, the motorized height adjustment structures synchronized for adjusting height of the beams by the same amount in the same direction upon operation of a common control.

In another aspect, there is provided a configurable computer workstation comprising: a base unit comprising first and second height-adjustable legs and a first horizontal I-beam, the first and second height-adjustable legs rigidly connected by the first horizontal I-beam, the base unit being without a user work surface; at least one expansion unit comprising a third height-adjustable leg and a second horizontal I-beam, the third height-adjustable leg rigidly connected to the second horizontal I-beam proximate an end of the second horizontal I-beam, the expansion unit comprising only one height-adjustable leg and being without a user work surface; a complementary clevis/tang arrangement for hingedly and removably connecting the expansion unit to the base unit, the clevis/tang arrangement comprising a clevis and a tang and a fastener for rotatably fastening the tang in the clevis so that the second horizontal I-beam can rotate about a vertical rotation axis to permit the repositioning of the third height-adjustable leg spatially in a horizontal plane relative to the first and second height-adjustable leg, the clevis comprising a pair of opposed vertically spaced-apart semicircular prongs extending from an end of either the first or second horizontal I-beam, each of the prongs comprising an aperture therein, the apertures vertically aligned, the tang comprising at least one bar extending from an end of the other of the first and second horizontal I-beams and insertable between the prongs, the at least one bar comprising an aperture therein, the aperture in the bar vertically alignable with the apertures in the prongs, the end of the other of the first and second horizontal I-beams comprising a semicircular cut-out complementary to and mated with one of the semicircular prongs, the fastener comprising a clevis pin insertable through the vertically aligned apertures in the prongs and bar to rotatably secure the tang in the clevis; the first horizontal I-beam comprising clevises at both ends thereof or tangs at both ends thereof, and the second horizontal I-beam comprising a clevis at one end thereof and a tang at the other end thereof; a clampable monitor mount clampable on one of the I-beams, the clampable monitor mount infinitely adjustable along a length of the one I-beam, the clampable monitor mount comprising a bracket having opposed open channels that receive a top flange of the one I-beam to permit sliding the monitor mount on the one I-beam while preventing the monitor mount from being lifted off the one I-beam, the clampable monitor mount further comprising a monitor mount clamp operable to non-moveably secure the monitor mount to the one I-beam substantially anywhere along a length of the one I-beam; and, first, second and third linear actuators mounted on the first, second and third height adjustable legs, respectively, the first, second and third linear actuators synchronized for adjusting height of the legs and therefore height of the I-beams by the same amount in the same direction upon operation of a common control.

The configurable computer workstation is modular and versatile permitting a multi-monitor configuration for a single user without having a fixed work surface as in a conventional desk. The work surface may be provided by a separate modular and/or moveable component that may be configured and positioned to the user's preference without affecting the configuration of the computer workstation. The workstation is reconfigurable in a variety of ways to accommodate a particular user, a particular task and/or a particular physical space occupied by the workstation. The video monitors may be raised or lowered to accommodate the height of a particular user. The video monitors may also be independently angled in three dimensions to accommodate a particular positioning or location of the user relative to the units in the workstation. The video monitors, as well as other accessories (e.g. CPU mount, power management mounts, wireways and the like), may be horizontally adjusted in infinite increments along a length of the beam to individually change the spatial relationship of that monitor (and/or other accessories) to the other monitors (and/or other accessories) in the workstation without moving the unit on which the monitor (and/or other accessories) is mounted. The units may be readily moved in relation to each other to change the spatial relationship between the video monitors on different units and/or to allow the workstation to fit into a constrained physical space. Any number of expansion units may be readily added to or subtracted from the workstation. The feet are replaceable with differently sized feet to accommodate support, space and traffic requirements around the workstation.

The configurable computer workstation is particularly designed for radiologists, but is also useful for control room applications where one operator must view multiple video monitors in doing various tasks. Even so, the configurable computer workstation is useful for any user having the need or desire for a multi-monitor configuration.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 1A depicts a front perspective view of a configurable computer workstation;

FIG. 1B depicts a rear perspective view of the workstation of FIG. 1A;

FIG. 2A depicts the workstation of FIG. 1A with legs extended;

FIG. 2B depicts the workstation of FIG. 1B with legs extended;

FIG. 4A depicts a front view of an expansion unit of the workstation of FIG. 1A with a monitor mounted thereon;

FIG. 4B depicts a side view of the expansion unit of FIG. 4A;

FIG. 4C depicts a top view of the expansion unit of FIG. 4A;

FIG. 5A depicts a front view of an expansion unit of the workstation of FIG. 1A shown with the monitor mounted at a left side of the expansion unit;

FIG. 5B depicts a top view of the expansion unit of FIG. 5A;

FIG. 5C depicts a front view of an expansion unit of the workstation of FIG. 1A shown with the monitor mounted centrally on the expansion unit;

FIG. 5D depicts a top view of the expansion unit of FIG. 5C with the monitor extended forward;

FIG. 5E depicts a front view of an expansion unit of the workstation of FIG. 1A shown with the monitor mounted at a right side of the expansion unit;

FIG. 5F depicts a top view of the expansion unit of FIG. 5E with the monitor angled inwardly;

FIG. 7A depicts a top perspective view of a base unit connected to an expansion unit with no accessories mounted thereon;

FIG. 7B is a magnified view of area A in FIG. 7A showing a connection between the base unit and the expansion unit;

FIG. 7C depicts a bottom perspective view of the base unit connected to the expansion unit of FIG. 7A;

FIG. 7D depicts a magnified view of area B in FIG. 7B showing the connection between the base unit and the expansion unit;

FIG. 8A depicts a clampable monitor mount with a monitor mounted thereon;

FIG. 8B depicts a magnified view of area E in FIG. 8A;

FIG. 8C depicts the monitor mount of FIG. 8A with the monitor dismounted from the monitor mount;

FIG. 8D depicts a magnified view of area F in FIG. 8C;

FIG. 11A depicts the workstation of FIG. 10A reconfigured into a semicircle; and, FIG. 11B depicts a top view of the workstation of FIG. 11A.

DETAILED DESCRIPTION

Figure 3A:
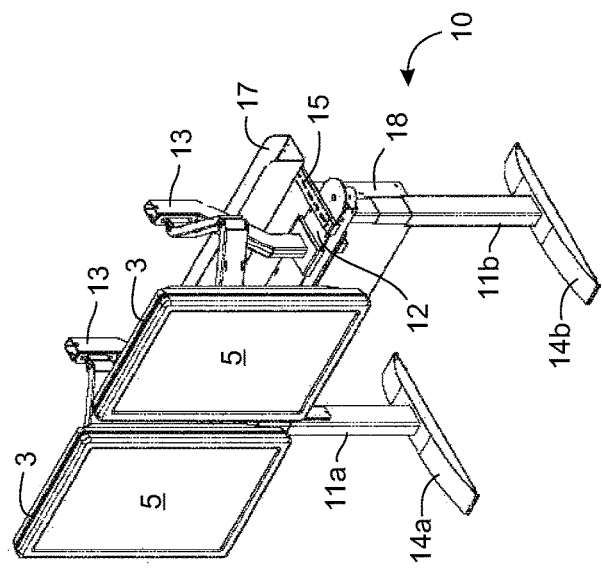
FIG. 3A depicts a front perspective view of a base unit of the workstation of FIG. 1A.

Referring to the FIG. 1A to FIG. 9F, a configurable computer workstation 1 comprises a base unit 10 pivotally connected to an expansion unit 40 at a pivot point 2, the base unit 10 and the expansion unit 40 pivotable about a vertical pivot axis passing through pivot point 2 so that the base unit 10 and the expansion unit 40 can move in a horizontal plane with respect to each other. Both the base unit 10 and the expansion unit 40 support computer equipment including, for example, one or more of video monitors 3 and a computer 4, the computer 4 having a computer processing unit (CPU) and other computer hardware components such as hard drives, USB ports, serial ports, VGA ports and the like. In the embodiment shown in FIG. 1A, two monitors 3 are supported on the base unit 10 and one monitor 3 is supported on the expansion unit 40, while the computer 4 is supported on the expansion unit 40 at a location below the monitors 3. Power cords, device cables, external drives and other computer peripherals (not shown) may also be supported and organized on the base unit 10 and/or the expansion unit 40. Neither the base unit 10 or the expansion unit 40 have a work surface (e.g. a desk or a table) on which a user may perform work, for example typing on a keyboard, operating a mouse, writing in a notebook and the like. The work surface is decoupled from the workstation 1 to provide greater reconfigurability of the workstation 1 because the workstation 1 is not constrained by the presence of an integrated work surface. Instead, the work surface may be provided as a separate component from the workstation 1.

The base unit 10 comprises two transversely spaced-apart vertically-oriented height-adjustable legs, for example first and second telescoping legs 11a and 11b as shown in FIG. 1A, supporting a first horizontally-oriented transverse beam, for example first I-beam 12 as shown in FIG. 1A, attached to and extending between the legs 11a, 11b proximate to or at tops of the legs 11a, 11b. Beams with other cross-sectional shapes may be used instead of an I-beam, for example a T-beam, an angle bracket, or a simple rectangular beam. I-beams and T-beams are particularly preferred for the way the beams can interact with mounting structures as described below. A horizontally-oriented transverse brace 19 extending between the legs 11a, 11b and attached to the legs 11a, 11b at an intermediate vertical position between the first I-beam 12 and the ground helps stabilize the base unit 10. The legs 11a, 11b are supported on the ground by a pair of horizontally extending feet 14a, 14b attached proximate to or at bottom ends of the legs 11a, 11b, respectively. The feet 14a, 14b may extend generally forwardly and/or rearwardly to help stabilize the base unit 10 on the ground. With two legs 11a, 11b and feet 14a, 14b, the base unit 10 is able to stand upright on the ground without further support.

The expansion unit 10 comprises one vertically-oriented height-adjustable leg, for example third telescoping leg 41 as shown in FIG. 1A, supporting a second horizontally-oriented transverse beam, for example second I-beam 42 as shown in FIG. 1A, attached to and extending horizontally from the leg 41 proximate to or at a top of the leg 41. Beams with other cross-sectional shapes may be used instead of an I-beam, for example a T-beam, an angle bracket, or a simple rectangular beam. I-beams and T-beams are particularly preferred for the way the beams can interact with mounting structures as described below. The leg 41 is attached to the second I-beam 42 proximate to or at an end of the second I-beam 42. The leg 41 is supported on the ground by a horizontally extending foot 44 attached proximate to or at a bottom end of the leg 41. The foot 44 may extend generally forwardly and/or rearwardly to help stabilize the expansion unit 10 on the ground. With only one leg 41 and foot 44, the expansion unit 40 is unable to stand upright on the ground without further support. However, when the second I-beam 42 is attached to the first I-beam 12, both the base unit 10 and the expansion unit 40 can upright, thereby stabilizing the entire workstation 1 in an upright position. Details of how the expansion unit 40 is pivotally connected to the base unit 10 and on how further expansion units may be added to the workstation are discussed below in connection with FIG. 7A to FIG. 7H.

The base unit 10 and the expansion unit 40 further comprises reconfigurable monitor mounts 13, each monitor mount 13 supporting one of the monitors 3 on the I-beams 12, 42. The first I-beam 12 supports two monitor mounts 13, while the second I-beam 42 supports one monitor mount 13. The monitor mounts 13 are moveably mounted on the I-beams 12, 42 by sliding the monitor mounts 13 on to top flanges 25, 45 of the I-beams 12, 42, respectively (see FIG. 3B and FIG. 4A). The monitor mounts 13 are moveable horizontally along the I-beams 12, 42 to permit re-positioning the monitors 3 longitudinally along the I-beams 12, 42. The monitor mounts 13 also permit positioning the monitors 3 in two-dimensions in the horizontal plane and permit rotating and tilting the monitors 3 about orthogonal horizontal axes. Details of the monitor mounts 13 are described below in connection with FIG. 8A to FIG. 9F. Details of how the monitor mounts 13 are mounted on the I-beams 12, 42 are described below in connection with FIG. 6A to FIG. 6C.

The base unit 10 and the expansion may further comprise one or more mounting accessories 15 other than the monitor mounts 13. The mounting accessories 15 may support other computer accessories or equipment, for example CPU cradles 16, cable organizers 17 and/or computer peripheral mounts 18. The mounting accessories 15 are moveably mounted on the I-beams 12, 42 by sliding the mounting accessories 15 on to the top flanges 25, 45 or bottom flanges 26, 46 of the I-beams 12, 42, respectively (see FIG. 3B and FIG. 4A). The mounting accessories 15 may also be moveable horizontally along the I-beams 12, 42 to permit re-positioning the other computer accessories or equipment longitudinally along the I-beams 12, 42. Details of how the mounting accessories 15 are mounted on the I-beams 12, 42 are described below in connection with FIG. 6A, FIG. 6B, FIG. 6D and FIG. 6E.

Figure 3C:
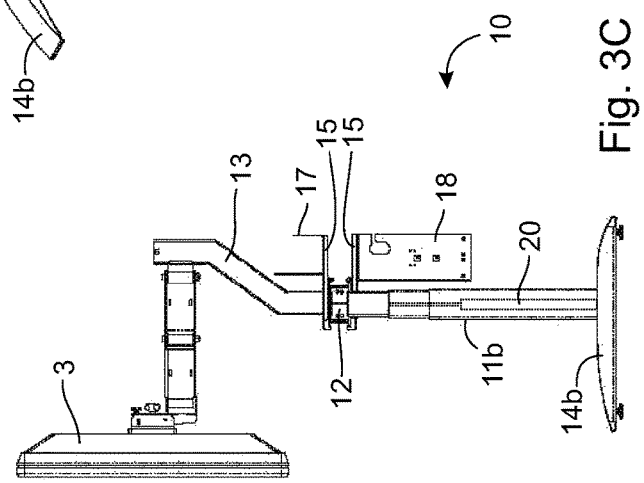
FIG. 3C depicts a side view of the base unit of FIG. 3A.
Figure 3D:
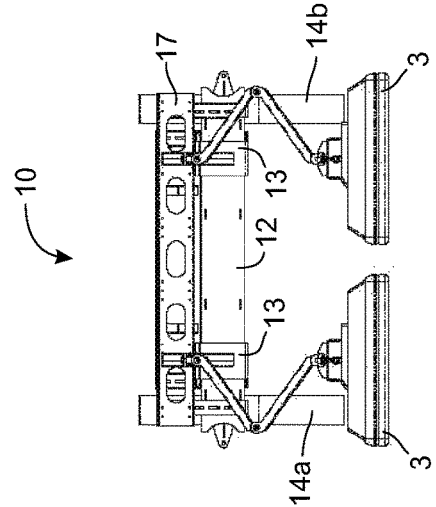
FIG. 3D depicts a top view of the base unit of FIG. 3A.
Figure 3B:
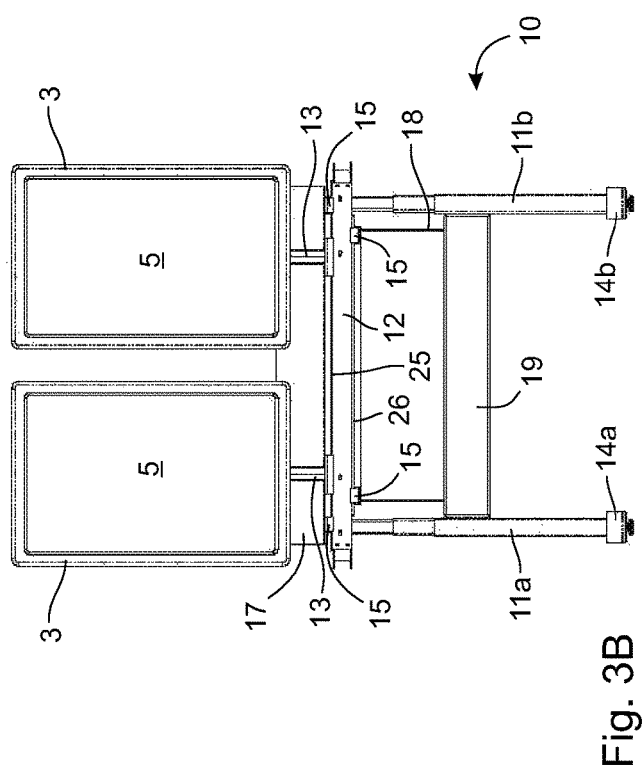
FIG. 3B depicts a front view of the base unit of FIG. 3A.

As seen comparing FIG. 1A to FIG. 2A or FIG. 1B to FIG. 2B, the workstation 1 is height adjustable. The base unit 10 is equipped with a first motorized height adjustment structure for adjusting height of the first beam 12 and the expansion unit 40 is equipped with a second motorized height adjustment structure for adjusting height of the second beam 42. The motorized height adjustment structures are electrically connectable in series and synchronized for adjusting height of the beams 12, 42 by the same amount in the same direction upon operation of a common controller. Any suitable motorized height adjustment structure may be employed, for example linear actuators, hydraulic cylinders, motor driven sprockets with a chain, motor driven pulleys with a belt, motor driven gears and the like. As seen in FIG. 3C and FIG. 4B, linear actuators 20 may be provided inside the telescoping legs 11a, 11b, 41 and the linear actuators linked electrically to actuate at the same time in the same direction at the same rate of speed to raise and lower the beams 12, 42 simultaneously.

With reference specifically to FIG. 5A to FIG. 5F, each monitor mount 13 is reconfigurable in various ways to permit positioning and orienting a screen 5 of the monitor 3 in a desired manner with respect to a user. FIG. 5A and FIG. 5B show the monitor 3 mounted on the beam 42 at a left side of the expansion unit 40. However, the monitor mount 13 is infinitely movable along the length of the beam 42, with FIG. 5C and FIG. 5D showing the monitor 3 mounted at the center of the beam 42 and FIG. 5E and FIG. 5F showing the monitor 3 mounted at a right side of the beam 42. Details of how the monitor mounts 13 are mounted on the I-beams 12, 42 are described below in connection with FIG. 6A, FIG. 6B and FIG. 6C.

The monitor 3 is also moveable forward and rearward in a direction transverse to the beam 42. The monitor mount comprises an articulated arm 51, on which the monitor 3 is mounted, and a support strut 52 (see FIG. 8A) mounted on the beam 42. The arm 51 is pivotally connected to the support strut 52 to permit pivoting of the arm 51 about a first vertical axis. The arm 51 comprises first and second arm sections 51a, 51b (see FIG. 8A) pivotally connected together to permit pivoting of the second arm section 51b about a second vertical axis. The combination of the two pivoting movements permits extending and retracting the arm 51 to move the monitor 3 forward and backward, respectively, transversely with respect to the beam 42 in the horizontal plane. FIG. 5B shows the monitor 3 in a retracted position proximate the beam 42; FIG. 5D shows the monitor 3 in an extended position forward of the beam 42; and, FIG. 5F shows the monitor 3 in an intermediate position between the retracted and extended positions. More details of the monitor mounts 13 including the articulated arms 51 and the support strut 52 are described below in connection with FIG. 8A to FIG. 8F. The monitor mounts 13 may be the same whether mounted on the beam 42 or the beam 12.

The monitor 3 is also pivotable about a vertical axis so that the screen 5 can be oriented angularly with respect to the beam 42. FIG. 5B and FIG. 5D show the screen 5 parallel to the beam 42. FIG. 5F shows the monitor 3 pivoted so that the screen 5 is oriented leftward. The monitor 3 can also be pivoted so that the screen 5 is oriented rightward. To pivot the monitor 3, the monitor 3 is pivotally mounted on a distal end of the articulated arm 51 so that the monitor 3 can pivot about a third vertical axis. Furthermore, the monitor 3 is tiltable about a horizontal axis to be able to orient the screen 5 upwardly or downwardly with respect to the horizontal axis. More details of the monitor mounts 13, including how the monitors 3 are pivotable and tiltable, are described below in connection with FIG. 8A to FIG. 8F and FIG. 9A to FIG. 9F.

Figure 6B:
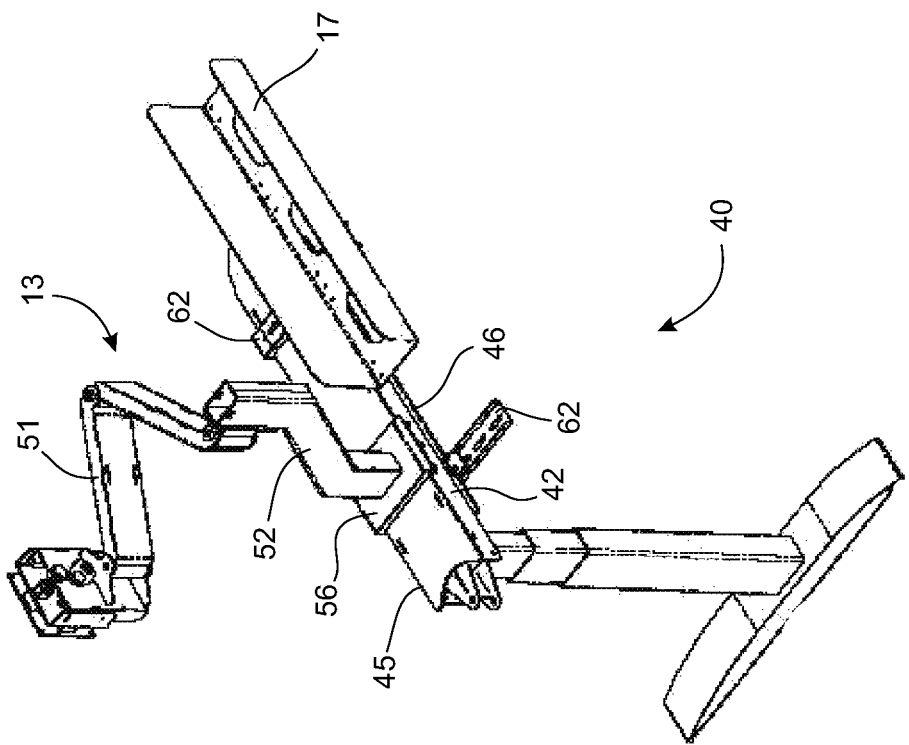
FIG. 6B depicts a rear perspective view of the expansion unit of FIG. 6A.
Figure 6A:
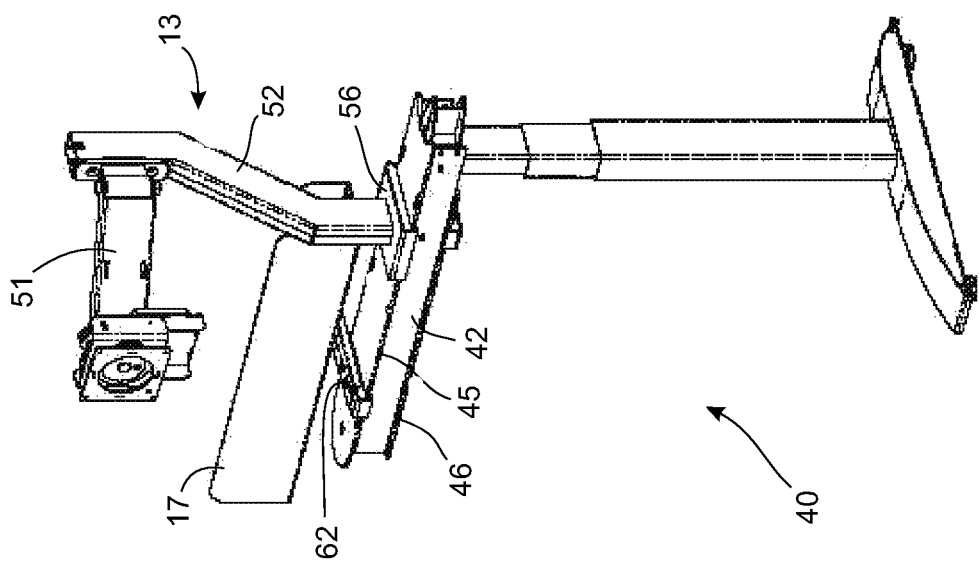
FIG. 6A depicts a front perspective view of an expansion unit without a monitor mounted thereon illustrating various mounting structures for computer equipment.
Figure 6D:
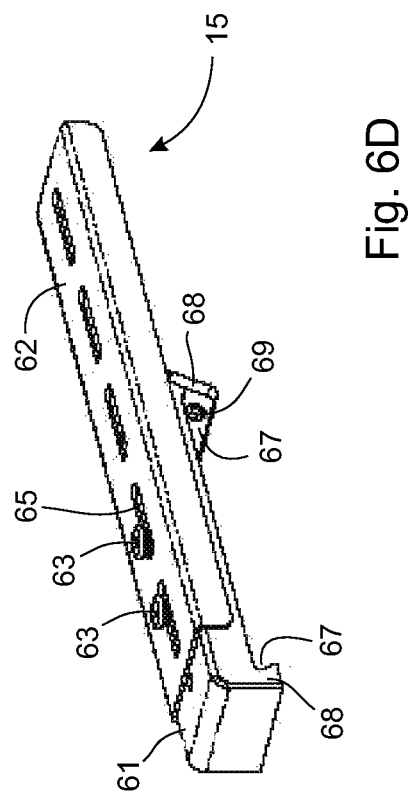
FIG. 6D depicts a perspective view of a mounting accessory for mounting other computer equipment on the expansion unit of FIG. 6A.
Figure 6E:
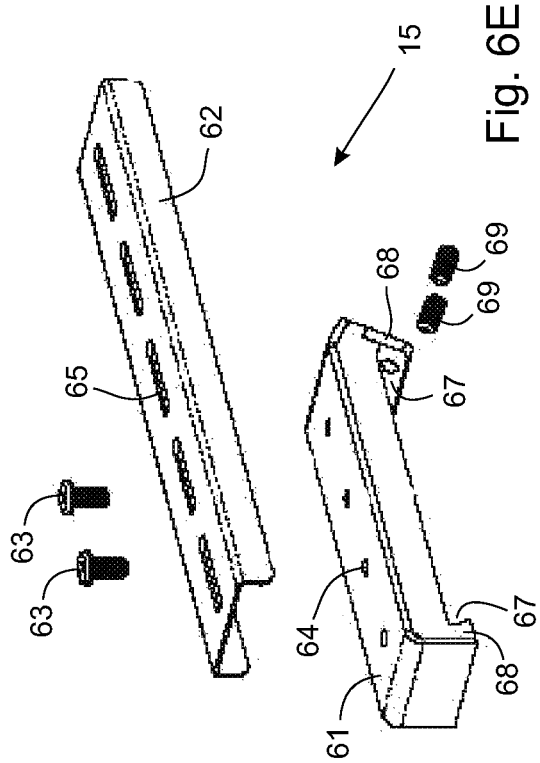
FIG. 6E depicts an exploded view of the mounting accessory of FIG. 6D.
Figure 6C:
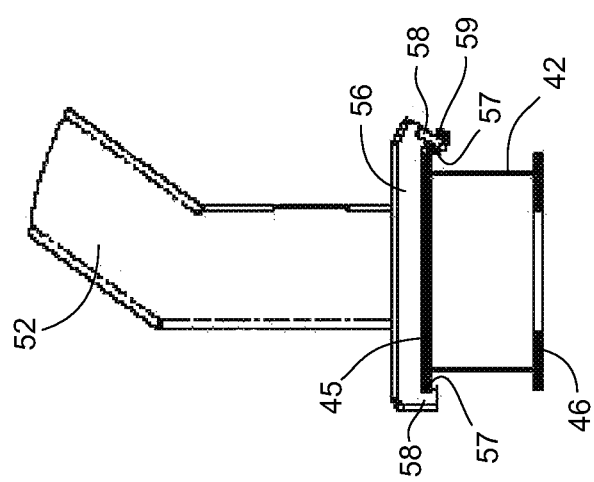
FIG. 6C depicts a side view of a lower portion of a monitor mount showing a bracket clamping the monitor mount to an I-beam of the expansion unit of FIG. 6A.
Figure 7F:
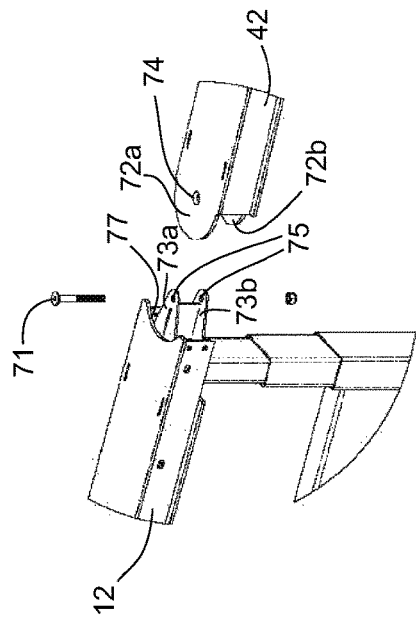
FIG. 7F depicts a magnified view of area C in FIG. 7E showing the disconnection between the base unit and the expansion unit.
Figure 7H:
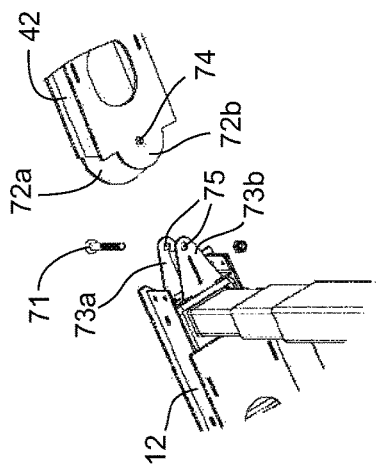
FIG. 7H depicts a magnified view of area D in FIG. 7G showing the disconnection between the base unit and the expansion unit.
Figure 7E:
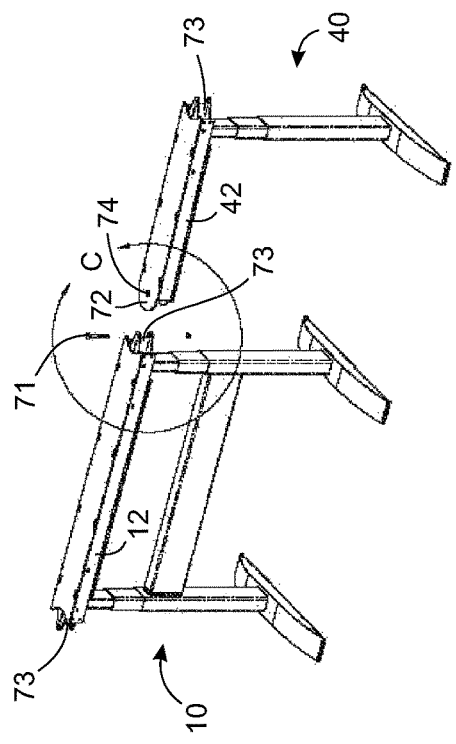
FIG. 7E depicts FIG. 7A with the base unit disconnected from the expansion unit.
Figure 7G:
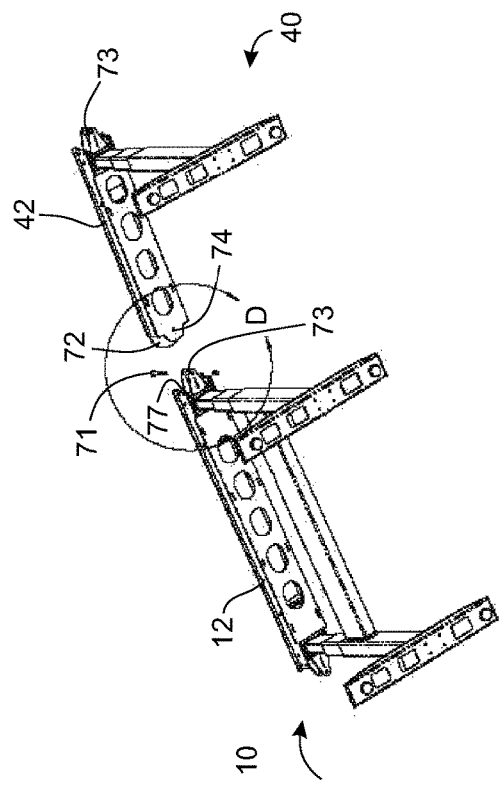
FIG. 7G depicts FIG. 7C with the base unit disconnected from the expansion unit.

With reference specifically to FIG. 6A to FIG. 6C, the monitor mount 13 is slidably mountable on the beam 42 of the expansion unit 40 (or likewise on the beam 12 of the base unit 10). The monitor mount 13 comprises a monitor mount bracket 56 to which the support strut 52 is rigidly attached, the support strut 52 extending upwardly and rearwardly from the monitor mount bracket 56, although the support strut 52 may extend forwardly if desire. The monitor mount bracket 56 comprises opposed open channels 57 formed in opposed downwardly extending lips 58. The opposed open channels 57 receive the top flange 45 of the I-beam 42 to permit sliding the monitor mount bracket 56 on the beam 42 while preventing the monitor mount bracket 56 from being lifted off the beam 42. To install the monitor mount bracket 56 on the I-beam 42, the monitor mount bracket 56 is slid on to the top flange 45 from one of the two ends of the I-beam 42. One or both of the downwardly extending lips 58 may be angled inwardly and have apertures therein to receive one or more set screws 59, which engage an underside of the top flange 45 to clamp the monitor mount bracket 56 on the beam 42 preventing the monitor mount bracket 56 from sliding on the beam 42 once the monitor mount bracket 56 is slid to a desired position on the beam 42. Thus, the one or more set screws 59 function as a clamp operable to non-moveably secure the monitor mount bracket 56 to the beam 42 substantially anywhere along a length of the beam 42. Other clamping mechanism may be employed. The monitor mount bracket 56 operates similarly on the I-beam 12 of the base unit 10.

With reference specifically to FIG. 6A, FIG. 6B, FIG. 6D and FIG. 6E, the mounting accessories 15 operate in a similar manner to the monitor mount brackets 56. The mounting accessory 15 comprises an accessory mount bracket 61 having opposed open channels 67 formed in opposed downwardly extending lips 68, which receive the top flange 45 or the bottom flange 46 of the I-beam 42 to permit sliding the mounting accessory 15 on the beam 42 while preventing the mounting accessory 15 from being lifted off or from falling off the beam 42. To install the accessory mount bracket 61 on the I-beam 42, accessory mount bracket 61 is slid on to the top flange 45 or bottom flange 46 from one of the two ends of the I-beam 42. One or both of the downwardly extending lips 68 may be angled inwardly and have apertures therein to receive one or more set screws 69, which engage a bottom side of the top flange 45 or a topside of the bottom flange 46 to clamp the accessory mount bracket 61 on the beam 42 preventing the accessory mount bracket 61 from sliding on the beam 42 once the mounting accessory 15 is slid to a desired position on the beam 42. Thus, the one or more set screws 69 function as a clamp operable to non-moveably secure the accessory mount bracket 61 to the beam 42 substantially anywhere along a length of the beam 42. Other clamping mechanism may be employed. The accessory mount bracket 61 operates similarly on the I-beam 12 of the base unit 10. The mounting accessory 15 further comprises an interface plate 62 that is secured to the accessory mount bracket 61 by bolts 63 through slots 65 (only one labeled) in the interface plate 62 and threaded apertures 64 (only one labeled) in the accessory mount bracket 61. The interface plate 62 provides a surface on which another computer accessory or equipment may be mounted, the slots 65 providing structure to which the other computer accessory or equipment may be mounted, for example the CPU cradle 16, cable organizer 17 and computer peripheral mount 18 (see FIG. 1B). Thus, the mounting accessories 15 may be situated above or below the beams 12, 42 and anywhere along the lengths of the beams 12, 42.

With reference specifically to FIG. 7A to FIG. 7H, the expansion unit 40 is hingedly and removably connected to the base unit 10 through a fastener 71. The expansion unit 40 is pivotable with respect to the base unit 10 about a vertical rotation axis passing through the fastener 71. The fastener 71 is preferably a clevis pin, which is preferably a bolt to permit securing the bolt with a nut. The fastener 71 is part of a connection structure 70 hingedly and removably connecting the beam 12 of the base unit 10 to the beam 42 of the expansion unit 40. In addition to the fastener 71, the connecting structure 70 comprises a complementary clevis/tang arrangement, wherein the clevis/tang arrangement comprises a clevis 72 and a tang 73. The tang 73 is rotatably fastened in clevis 72 by the fastener 71 so that the beam 42 can rotate about the vertical rotation axis to permit the repositioning of the leg 41 of the expansion unit 40 spatially in a horizontal plane relative to the legs 11a, 11b of the base unit 10.

The beam 12 of the base unit 10 may have two clevises 72, one at each end, or two tangs 73, one at each end, or one clevis 72 and one tang 72. Likewise, the beam 42 of expansion unit 40 may have two clevises 72, one at each end, or two tangs 73, one at each end, or one clevis 72 and one tang 72. However, to provide greater options for reconfigurability and expandability of the workstation 1, it is preferred that the beam 12 of the base unit 10 has either clevises 72 at both ends or two tangs 73 at both ends, and that the beam 42 of expansion unit 40 has one clevis 72 at one end and one tang 73 at the other end. Such an arrangement permits adding more expansion units in series to the ends of subsequent of expansion units, as seen in FIG. 10A, FIG. 10B, FIG. 11A and FIG. 11B.

In the embodiments shown in the Figures, the beam 12 of the base unit 10 has two tangs 73, one at each end of the beam 12; while the beam 42 of the expansion unit 40 has a clevis 72 at an end of the beam 42 distal from the leg 41 and a tang 72 at an end proximate the leg 41. The clevis 72 comprises a pair of opposed vertically spaced-apart semi-circular prongs 72a, 72b extending from an end of the beam 42. Each of the prongs 72a, 72b comprises an aperture 74 therein, the apertures 74 vertically aligned. The tang 73 comprises a pair of opposed vertically spaced-apart bars 73a, 73b extending from an end of the beam 12, the bars 73a, 73b insertable between the prongs 72a, 72b. Each of the bars 73a, 73b comprises an aperture 75 therein, the apertures 75 vertically aligned and vertically alignable with the apertures 74 in the prongs 72a, 72b. The end of the beam 12 comprises a semicircular cut-out 77 complementary to and mated with the semicircular prong 72a. The fastener 71 is insertable through the vertically aligned apertures 74 and 75 in the prongs 72a, 72b and bars 73a, 73b, respectively, to rotatably secure the tang 73 in the clevis 72.

With reference specifically to FIG. 8A to FIG. 8F and FIG. 9A to FIG. 9F, the monitor mounts 13 are designed to permit translating, pivoting and tilting of the monitors 3 to permit placing the screen 5 in a desired position and orientation with respect to a user. The monitor mount 13 permits such translating, pivoting and tilting in three dimensions. As previously discussed, to effect translation of the monitor 3 forward and backward and side to side in a horizontal plane, the monitor mount 13 comprises the articulated arm 51 having the first and second arm sections 51a, 51b pivotally mounted for rotation about first and second vertical axes. The first vertical axis passes through a vertically oriented first pivot pin 53 that pivotally mounts the first arm section 51a to the support strut 52. The second vertical axis passes through a vertically oriented second pivot pin 54 that pivotally mounts the second arm section 51b to the first arm section 51a. Pivoting of the articulated arm 51 about the first and second pivot pins 53, 54 permits extension and retraction of the articulated arm 51 and side to side relative motion of a distal end of the second arm section 51b relative to the first arm section 51a. Thus, the monitor 3 can be moved forward and backward and side to side in the horizontal plane. Also, as previously discussed, the monitor mount 13 permits pivoting the monitor 3 about a third vertical axis so that the screen 5 can face forward or more leftward or more rightward. Thus, the monitor 3 is pivotally mounted on a distal end of the second arm section 51b by a vertically oriented third pivot pin 55.

Figure 8F:
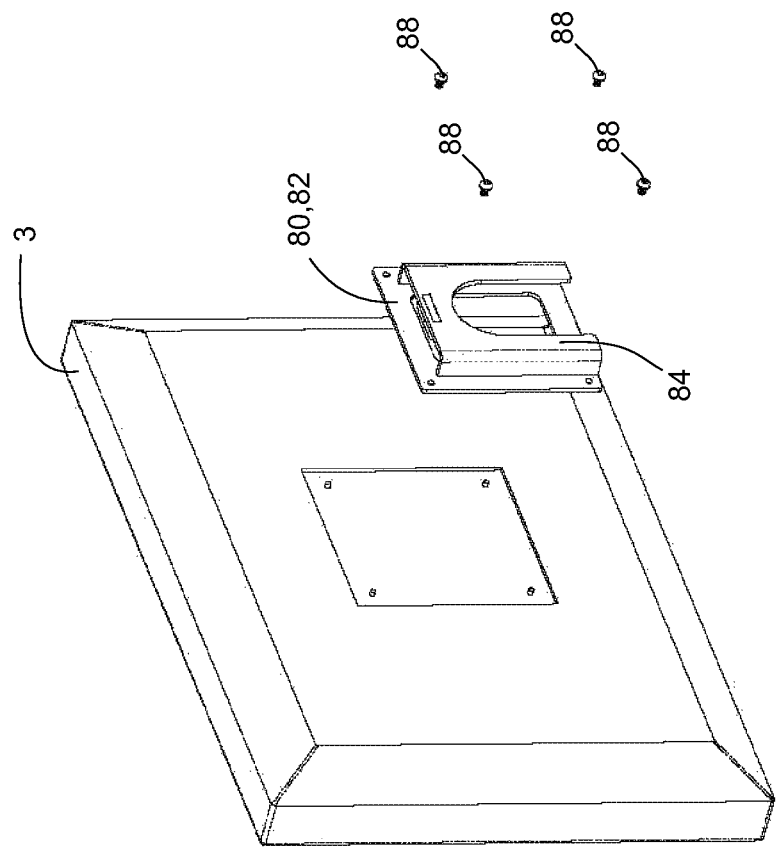
FIG. 8F depicts an exploded view of the monitor of FIG. 8E.
Figure 8E:
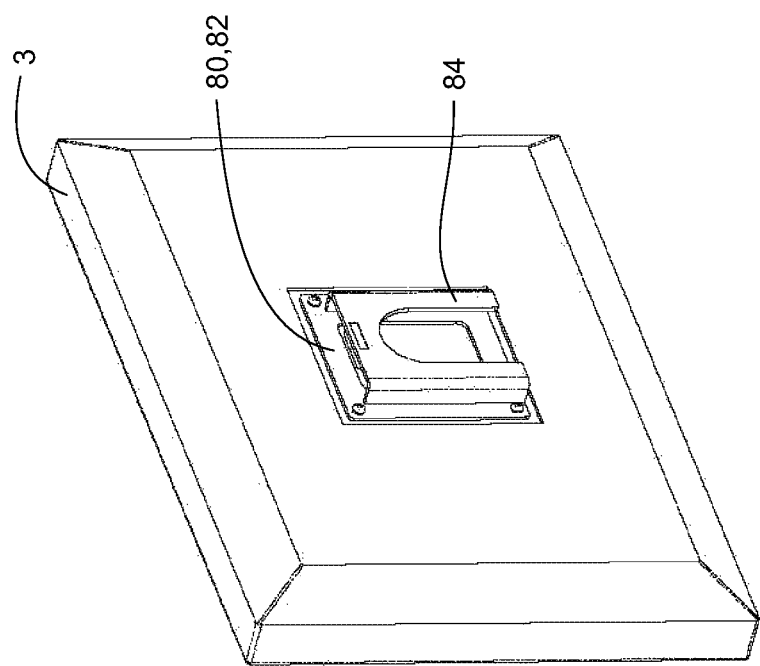
FIG. 8E depicts a rear perspective view of a monitor having a monitor hanger to which a rear surface of the monitor is fixedly secured.
Figure 9E:
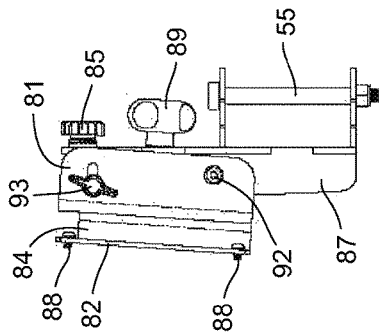
FIG. 9E depicts a side view of the monitor adjustment assembly of FIG. 9A.
Figure 9F:
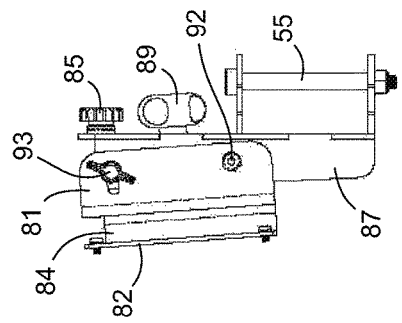
FIG. 9F depicts the monitor adjustment assembly of FIG. 9A with the monitor hanger rotated about a second horizontal axis illustrating the ability of the monitor adjustment assembly to permit tilting of the monitor out of a vertical plane.
Figure 9C:
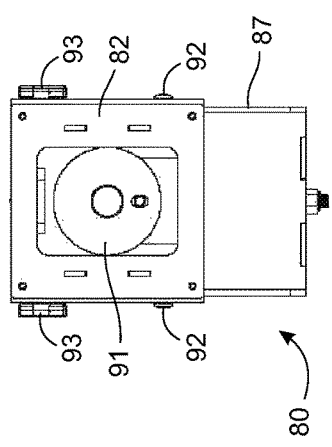
FIG. 9C depicts a front view of the monitor adjustment assembly of FIG. 9A.
Figure 9D:
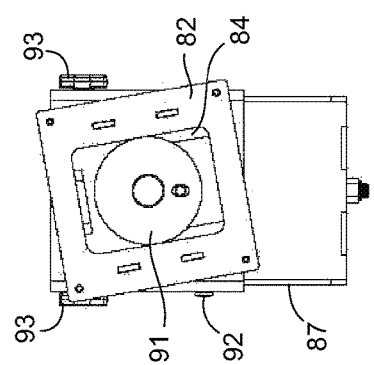
FIG. 9D depicts the monitor adjustment assembly of FIG. 9C with the removeable monitor hanger rotated about a first horizontal axis illustrating the ability of the monitor adjustment assembly to permit rotation of a monitor in a plane of a screen of the monitor.
Figure 9A:
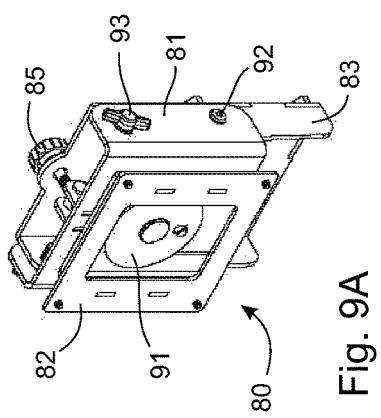
FIG. 9A depicts a front perspective view of monitor adjustment assembly together with a removeable monitor hanger supported therein for removably mounting a monitor on a monitor mount.
Figure 9B:
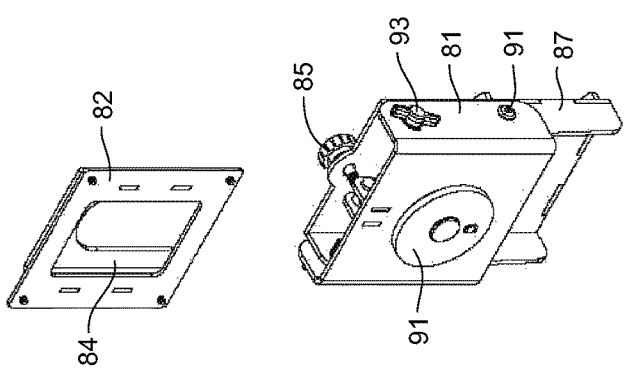
FIG. 9B depicts the monitor adjustment assembly of FIG. 9A with the removeable monitor hanger removed therefrom.

As best shown in FIG. 8C and FIG. 8D, to facilitate removal of the monitor 3 from the monitor mount 13, a two-part monitor hanging assembly 80 is provided, the monitor hanging assembly 80 comprising a monitor adjustment assembly 81 pivotally mounted on the distal end of the second arm section 51b by the vertically oriented third pivot pin 55 and a removeable monitor hanger 82 secured to a back of the monitor 3, for example by screws 88 as seen in FIG. 8F although other fasteners such as bolts, adhesive and hook and loop fasteners my be used. The removeable monitor hanger 82 comprises a notched slide 84 that is complementary to and slidable in a receiver 83 of the monitor adjustment assembly 81. The notched slide 84 slides downward into the receiver 83 through an open top end of the receiver 83. The notched slide 84 comprises a locking slot 86 that aligns with a locking thumb screw 85 of the receiver 83 when the notched slide 84 is fully seated in the receiver 83. The notch in the notched slide 84 prevents interference between the notched slide 84 and the locking thumb screw 85 as the notched slide 84 slides into the receiver 83. With the notched slide 84 fully seated in the receiver 83, the locking thumb screw 85 can be tightened to engage within the locking slot 86 to prevent the monitor 3 from being dismounted. Loosening the locking thumb screw 85 sufficiently disengages the locking thumb screw 85 from the locking slot 86 permitting dismounting of the monitor 3.

As previously discussed, the monitor mount 13 permits rotating and tilting the monitor 3 about orthogonal horizontal axes. With reference specifically to FIG. 9A to FIG. 9F, the receiver 83 of the monitor adjustment assembly 81 comprises a circular bearing 91 that supports the notched slide 84 of the removeable monitor hanger 82, an outer edge of the bearing 91 engaging inner edges of the notch of the notched slide 84 when the notched slide 84 is seated in the receiver 83. With the locking thumb screw 85 loosened, notched slide 84, and therefore the removeable monitor hanger 82, is rotatable about a transverse horizontal axis passing through a center of the bearing 91. In this manner, the monitor 3 may be rotated about the transverse horizontal axis in a plane of the screen 5 of the monitor 3. The monitor adjustment assembly 81 further comprises a mounting bracket 87 on which the receiver 83 is pivotally mounted by first horizontally oriented pins 92 and second horizontally oriented pins 93. The mounting bracket 87 mounts the receiver on the second arm section 51b by the vertically oriented third pivot pin 55. The second horizontally oriented pins 93 pass through slots in sidewalls of the mounting bracket 87 and the receiver 83, which permits rotation of the receiver 83 about a longitudinally oriented horizontal rotation axis passing through the first horizontally oriented pins 92. Rotation of the receiver 83 about the longitudinally oriented horizontal rotation axis results in being able to tilt the monitor 3 upwardly and downwardly out of a vertical plane, at least to the extent that the slots in the sidewalls of the mounting bracket 87 and the receiver 83 permit. The bolt 89 may be tightened and loosened to prevent and permit tilting of the monitor 3.

Figure 10B:
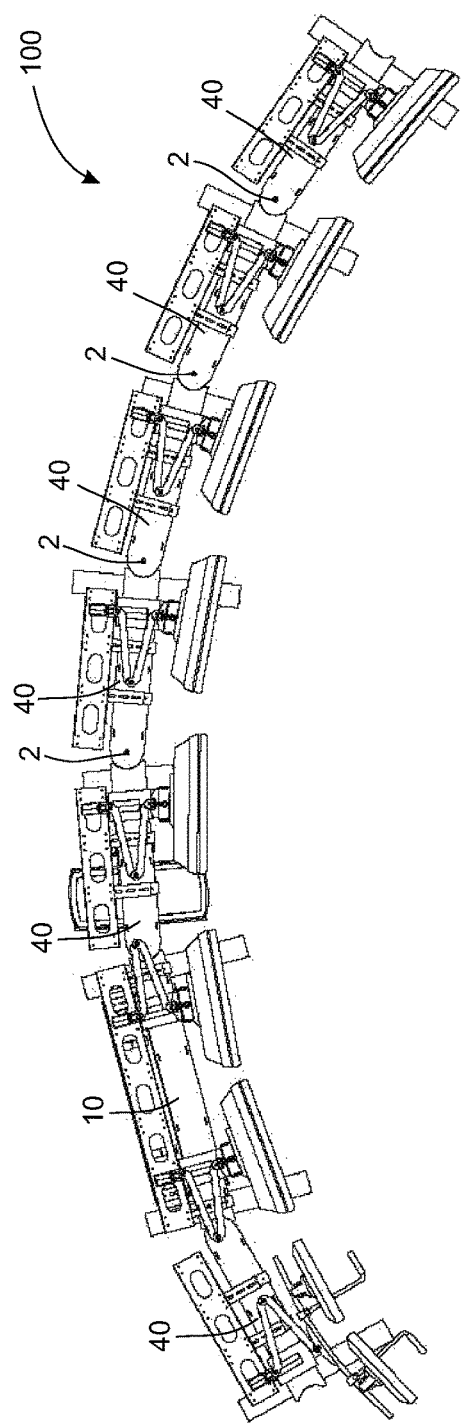
FIG. 10B depicts a top view of the workstation of FIG. 10A.
Figure 10A:
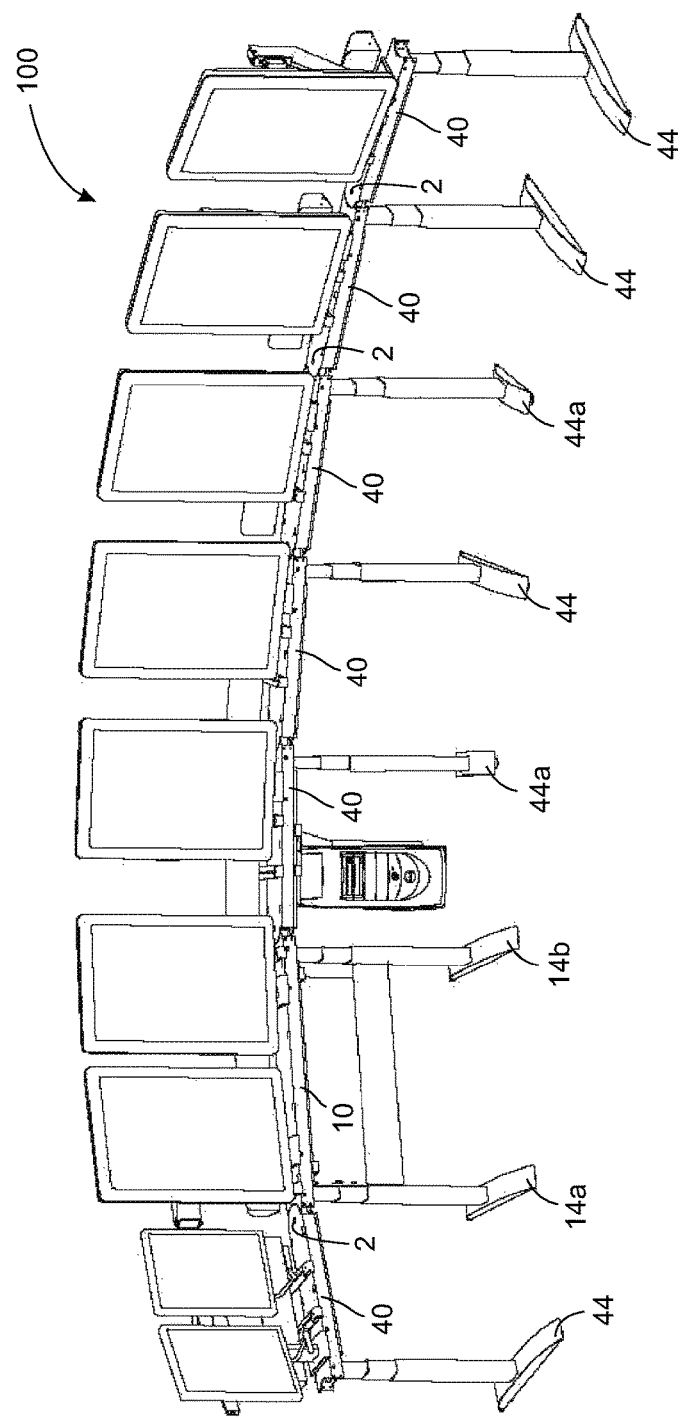
FIG. 10A depicts a front perspective view of a configurable computer workstation having one base unit and six expansion units configured in a curve.

FIG. 10A and FIG. 10B depict a configurable computer workstation 100 having one base unit 10 and six expansion units 40 configured in a curve. Simply by adding expansion units 40, the computer workstation 100 can be created from the computer workstation 1 of FIG. 1. If a different configuration is desired, the computer workstation 100 may be reconfigured by pivoting expansion units 40 about the vertical axis at the pivot points 2. FIG. 11A and FIG. 11B depict the workstation 100 reconfigured into a semicircle. Expansion units 40 may be added or removed or reconfigured as desired to result in an appropriately configured workstation for the circumstances. If desired, some or all of the expansion units 40, or even the base unit 10 may be provided with different sized feet, for example large feet 44 or small feet 44a, depending on the required footprint of the workstation. The feet on both the base unit and the expansion unit may be removable and interchangeable. In some embodiments, more than one base unit 10 can be utilized in a workstation. Height-adjustability of the legs on all of the units may be synchronized so that all of the units can be raised and lowered simultaneously.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A configurable computer workstation comprising:
   a base unit comprising first and second height-adjustable legs and a first horizontal I-beam, the first and second height-adjustable legs rigidly connected by the first horizontal I-beam, the base unit being without a user work surface;
   at least one expansion unit comprising a third height-adjustable leg and a second horizontal I-beam, the third height-adjustable leg rigidly connected to the second horizontal I-beam proximate an end of the second horizontal I-beam, the expansion unit comprising only one height-adjustable leg and being without a user work surface;
   a complementary clevis/tang arrangement for hingedly and removably connecting the expansion unit to the base unit, the clevis/tang arrangement comprising a clevis and a tang and a fastener for rotatably fastening the tang in the clevis so that the second horizontal I-beam can rotate about a vertical rotation axis to permit repositioning of the third height-adjustable leg spatially in a horizontal plane relative to the first and second height-adjustable leg,
   the clevis comprising a pair of opposed vertically spaced-apart semicircular prongs extending from an end of either the first or second horizontal I-beam, each of the prongs comprising an aperture therein, the apertures vertically aligned,
   the tang comprising at least one bar extending from an end of another of the first and second horizontal I-beams and insertable between the prongs, the at least one bar comprising an aperture therein, the aperture in the bar vertically alignable with the apertures in the prongs, the end of the other of the first and second horizontal I-beams comprising a semicircular cut-out complementary to and mated with one of the semicircular prongs,
   the fastener comprising a clevis pin insertable through the vertically aligned apertures in the prongs and bar to rotatably secure the tang in the clevis;
   the first horizontal I-beam comprising clevises at both ends thereof or tangs at both ends thereof, and the second horizontal I-beam comprising a clevis at one end thereof and a tang at the other end thereof;
   a clampable monitor mount clampable on one of the I-beams, the clampable monitor mount infinitely adjustable along the one I-beam, the clampable monitor mount comprising a bracket having opposed open channels that receive a top flange of the one I-beam to permit sliding the monitor mount on the one I-beam while preventing the monitor mount from being lifted off the one !-beam, the clampable monitor mount further comprising a monitor mount clamp operable to non-moveably secure the monitor mount to the one I-beam substantially anywhere along the one I-beam; and,
   first, second and third linear actuators mounted on the first, second and third height adjustable legs, respectively, the first, second and third linear actuators synchronized for adjusting height of the legs and therefore height of the I-beams by a same amount in a same direction upon operation of a common control.

2. The workstation of claim 1, wherein the height adjustable legs are telescoping legs.

3. The workstation of claim 1, wherein the monitor mount comprises:
   a forwardly or rearwardly angled vertically-oriented strut;
   a monitor adjustment assembly hingedly attached to the strut by an articulated hinged arm to permit adjustment of the monitor adjustment assembly in at least two dimensions; and,
   a removeable hanger to which a monitor may be fixedly secured, the hanger removably mountable on the monitor adjustment assembly to removably mount the monitor on the monitor mount.

4. The workstation of claim 1, wherein the height-adjustable legs comprise removeable feet and/or size-adjustable feet.

5. A configurable computer workstation comprising:
   a base unit comprising first and second height-adjustable legs and a first horizontal beam, the first and second height-adjustable legs rigidly connected by the first horizontal beam;
   at least one expansion unit comprising a third height-adjustable leg and a second horizontal beam, the third height-adjustable leg rigidly connected to the second horizontal beam proximate an end of the second horizontal beam;
   a connecting structure for hingedly and removably connecting the expansion unit to the base unit to permit repositioning of the third height-adjustable leg spatially in a horizontal plane relative to the first and second height-adjustable legs;
   a clampable monitor mount clampable on one of the beams, the clampable monitor mount infinitely adjustable along the one beam; and,
   a first motorized height adjustment structure on the base unit for adjusting height of the first horizontal beam, a second motorized height adjustment structure on the expansion unit for adjusting height of the second horizontal beam, the motorized height adjustment structures synchronized for adjusting height of the beams by a same amount in a same direction upon operation of a common control
wherein the base unit and the at least one expansion unit do not have user work surfaces mounted thereon.

6. The workstation of claim 5, wherein the expansion unit has only one leg.

7. The workstation of claim 5, wherein connecting structure for hingedly and removably connecting the expansion unit to the base unit comprises a complementary clevis/tang arrangement, wherein the clevis/tang arrangement comprises a clevis and a tang and a fastener for rotatably fastening the tang in the clevis so that the second horizontal beam can rotate about a vertical rotation axis to permit repositioning of the third height-adjustable leg spatially in a horizontal plane relative to the first and second height-adjustable legs.

8. The workstation of claim 7, wherein the clevis comprises a pair of opposed vertically spaced-apart semicircular prongs extending from an end of either the first or second horizontal beam, each of the prongs comprising an aperture therein, the apertures vertically aligned,
   and wherein the tang comprises a pair of opposed vertically spaced-apart bars extending from an end of another of the first and second horizontal beams and insertable between the prongs, each of the bars comprising an aperture therein, the apertures vertically aligned and vertically alignable with the apertures in the prongs, the end of the other of the first and second horizontal beams comprising a semicircular cut-out complementary to and mated with one of the semicircular prongs, and wherein the fastener comprises a clevis pin insertable through the vertically aligned apertures in the prongs and bars to rotatably secure the tang in the clevis.

9. The workstation of claim 8, wherein the first horizontal beam comprises clevises at both ends thereof or tangs at both ends thereof, and the second horizontal beam comprises a clevis at one end thereof and a tang at the other end thereof.

10. The workstation of claim 5, wherein the first horizontal beam and/or the second horizontal beam is an I-beam or T-beam, the I-beam or T-beam comprising a horizontally extending top flange, and wherein the clampable monitor mount comprises a monitor mount bracket having opposed open channels that receive the top flange to permit sliding the monitor mount on the beam while preventing the monitor mount from being lifted off the beam, the clampable monitor mount further comprising a monitor mount clamp operable to non-moveably secure the monitor mount to the beam substantially anywhere along the beam.

11. The workstation of claim 10, wherein the first and second horizontal beams are I-beams, each of the I-beams further comprising a horizontally extending bottom flange, and wherein the workstation further comprises one or more mounting accessories other than the monitor mount, at least one of the other mounting accessories comprising an accessory mount bracket having opposed open channels that receive the bottom flange to permit sliding the mounting accessory on the beam while preventing the mounting accessory from falling off the beam, the mounting accessory further comprising a mounting accessory clamp operable to non-moveably secure the mounting accessory to the beam substantially anywhere along the beam.

12. The workstation of claim 5, wherein the first and second motorized height adjustment structures comprise linear actuators associated with the height adjustable legs, whereby synchronous operation of the linear actuators adjust the height of the legs to adjust the height of the beams by a same amount in a same direction upon operation of the common control.

13. The workstation of claim 5, wherein the height adjustable legs are telescoping legs.

14. The workstation of claim 5, wherein the monitor mount comprises:
  a forwardly or rearwardly angled vertically-oriented strut;
  a monitor adjustment assembly hingedly attached to the strut by an articulated hinged arm to permit adjustment of the monitor adjustment assembly in at least two dimensions; and,
  a removeable hanger to which a monitor may be fixedly secured, the hanger removably mountable on the monitor adjustment assembly to removably mount the monitor on the monitor mount.

15. The workstation of claim 5, wherein the height-adjustable legs comprise removeable feet and/or size-adjustable feet.

16. A configurable computer workstation comprising:
  a base unit comprising first and second height-adjustable legs and a first horizontal beam, the first and second height-adjustable legs rigidly connected by the first horizontal beam;
  at least one expansion unit comprising a third height-adjustable leg and a second horizontal beam, the third height-adjustable leg rigidly connected to the second horizontal beam proximate an end of the second horizontal beam;
  a connecting structure for hingedly and removably connecting the expansion unit to the base unit to permit repositioning of the third height-adjustable leg spatially in a horizontal plane relative to the first and second height-adjustable legs;
  a clampable monitor mount clampable on one of the beams, the clampable monitor mount infinitely adjustable along the one beam; and,
  a first motorized height adjustment structure on the base unit for adjusting height of the first horizontal beam, a second motorized height adjustment structure on the expansion unit for adjusting height of the second horizontal beam, the motorized height adjustment structures synchronized for adjusting height of the beams by a same amount in a same direction upon operation of a common control, wherein the first and second horizontal beams are I-beams, each of the I-beams further comprising a horizontally extending bottom flange, and wherein the workstation further comprises one or more mounting accessories other than the monitor mount, at least one of the other mounting accessories comprising an accessory mount bracket having opposed open channels that receive the bottom flange to permit sliding the mounting accessory on the beam while preventing the mounting accessory from falling off the beam, the mounting accessory further comprising a mounting accessory clamp operable to non-moveably secure the mounting accessory to the beam substantially anywhere along the beam.

17. The workstation of claim 16, wherein the monitor mount comprises:
  a forwardly or rearwardly angled vertically-oriented strut;
  a monitor adjustment assembly hingedly attached to the strut by an articulated hinged arm to permit adjustment of the monitor adjustment assembly in at least two dimensions; and,
  a removeable hanger to which a monitor may be fixedly secured, the hanger removably mountable on the monitor adjustment assembly to removably mount the monitor on the monitor mount.

* * * * *